United States Patent
Moon et al.

(10) Patent No.: US 9,678,250 B2
(45) Date of Patent: Jun. 13, 2017

(54) METHOD OF FABRICATING LIGHT FUNCTIONAL SUBSTRATE AND ORGANIC LIGHT EMITTING DIODE HAVING THE SAME

(71) Applicant: Electronics and Telecommunications Research Institute, Daejeon (KR)

(72) Inventors: Jaehyun Moon, Daejeon (KR); Seung Koo Park, Daejeon (KR); Doo-Hee Cho, Daejeon (KR); Jin Wook Shin, Daejeon (KR); Jun-Han Han, Daejeon (KR); Jonghee Lee, Daejeon (KR); Joo Hyun Hwang, Seoul (KR); Chul Woong Joo, Seoul (KR); Jin Woo Huh, Daejeon (KR); Nam Sung Cho, Daejeon (KR); Jong Tae Lim, Seoul (KR); Jeong Ik Lee, Daejeon (KR); Byoung Gon Yu, Chungcheongbuk-do (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 466 days.

(21) Appl. No.: 14/210,575

(22) Filed: Mar. 14, 2014

(65) Prior Publication Data
US 2015/0086761 A1    Mar. 26, 2015

(30) Foreign Application Priority Data
Sep. 23, 2013 (KR) ......................... 10-2013-0112719

(51) Int. Cl.
G02B 5/02 (2006.01)

(52) U.S. Cl.
CPC ..... *G02B 5/0268* (2013.01); *Y10T 428/24893* (2015.01)

(58) Field of Classification Search
CPC .......................................................... G02B 5/02
USPC ........................................... 427/162; 428/206
See application file for complete search history.

(56) References Cited

U.S. PATENT DOCUMENTS

2012/0114920 A1* 5/2012 Yoon .................. B81C 1/00373
                                                        428/204
2012/0321810 A1* 12/2012 Tebby ..................... B05D 1/18
                                                        427/443.2

FOREIGN PATENT DOCUMENTS

KR    10-2013-0054273 A     5/2013

OTHER PUBLICATIONS

J. Alexander Liddle et al., "Lithographically directed self-assembly of nanostructures", J. Vac. Sci. Technol. B, vol. 22, No. 6, Nov./Dec. 2004.

* cited by examiner

*Primary Examiner* — Alexander Weddle
(74) *Attorney, Agent, or Firm* — Rabin & Berdo, P.C.

(57) ABSTRACT

Provided is a method of fabricating a light functional substrate. The method includes applying particles onto a surface of water contained in a container to form a monolayer constituted by the particles, immersing a substrate into the container, drawing the substrate out of the container to form patterns constituted by the particles on the substrate in a first direction, and forming a planarization film covering the patterns on the substrate.

4 Claims, 9 Drawing Sheets

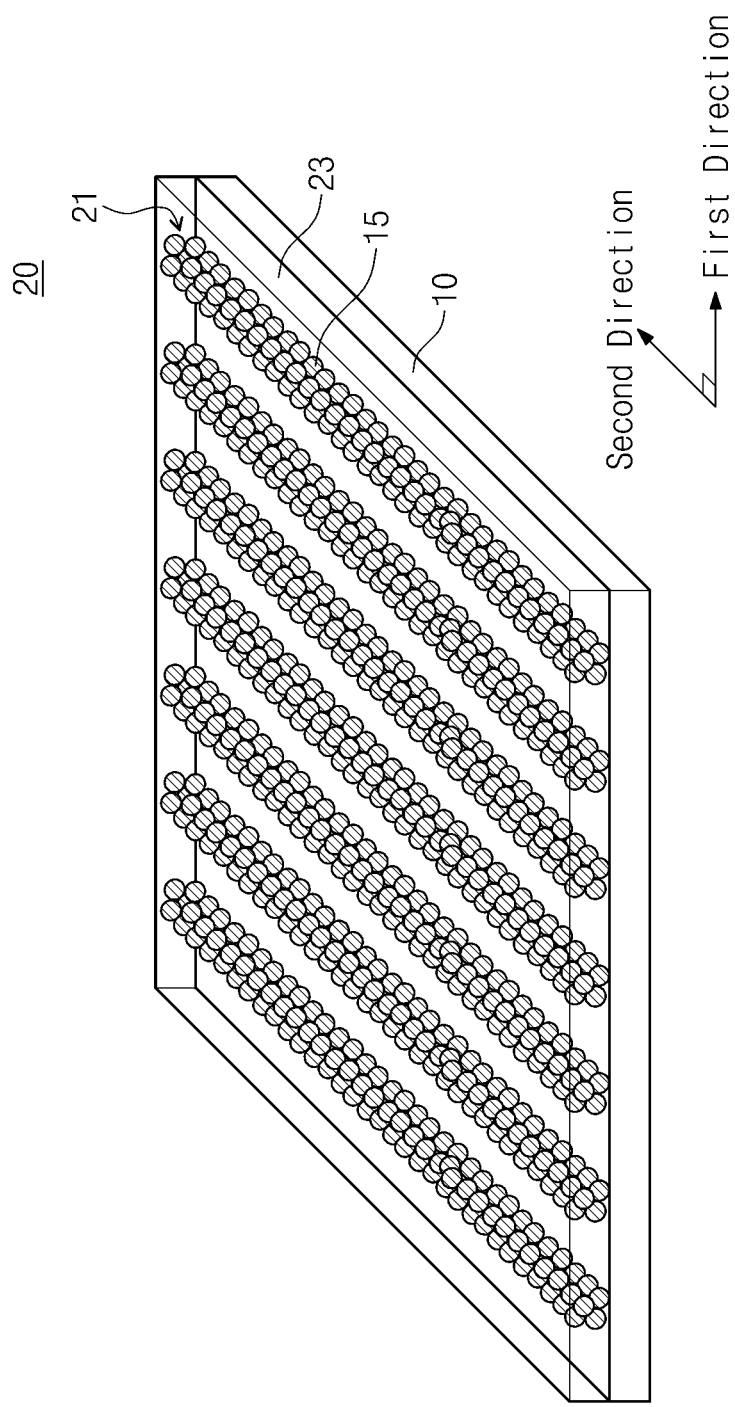

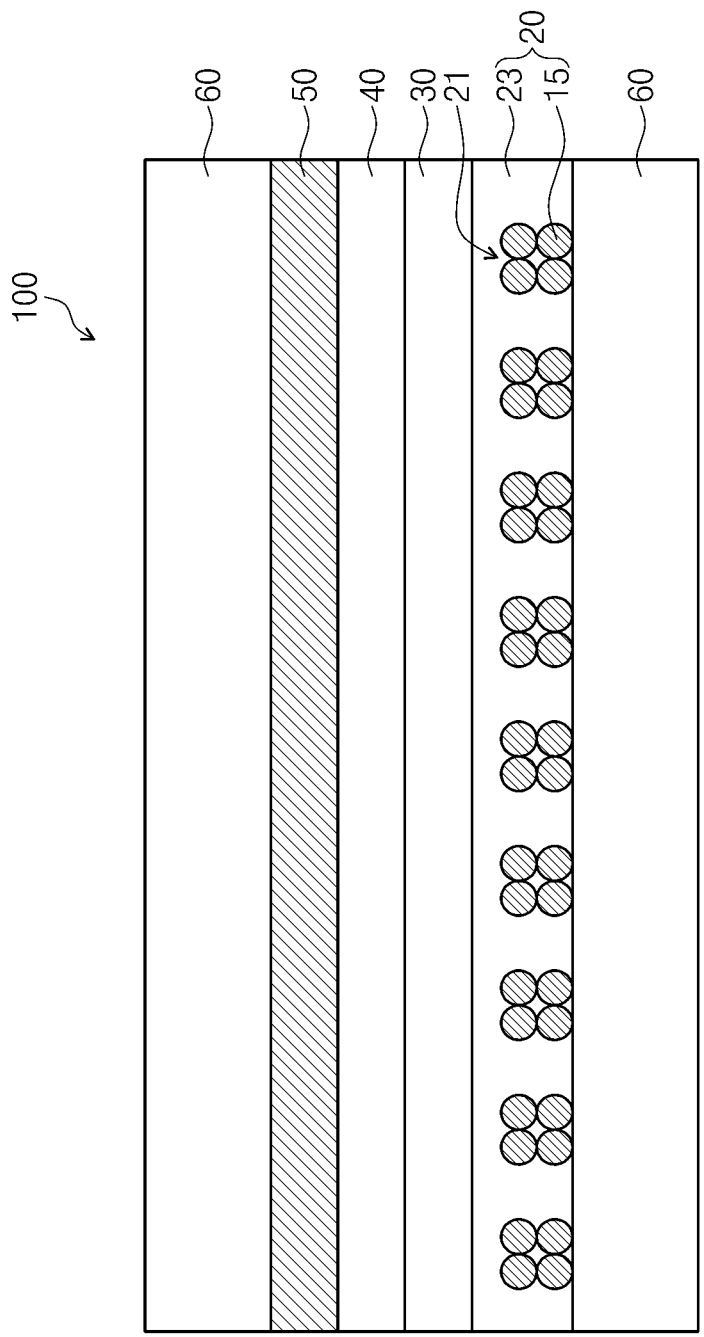

METHOD OF FABRICATING LIGHT FUNCTIONAL SUBSTRATE AND ORGANIC LIGHT EMITTING DIODE HAVING THE SAME

CROSS-REFERENCE TO RELATED APPLICATIONS

This U.S. non-provisional patent application claims priority under 35 U.S.C. §119 of Korean Patent Application No. 10-2013-0112719, filed on Sep. 23, 2013, the entire contents of which are hereby incorporated by reference.

BACKGROUND OF THE INVENTION

The present invention disclosed herein relates to a method of fabricating a light functional substrate and an organic light emitting diode having the same, and more particularly, to a method of fabricating a light functional substrate formed by using a Langmuir-Blodgett method and an organic light emitting diode having the same.

Organic light emitting diodes are self-emitting devices in which an organic emitting material is electrically excited to emit light. Such an organic light emitting diode includes a substrate, an anode, a cathode, and an organic light emitting layer between the anode and the cathode. Holes and electrons supplied from the anode and cathode are combined with each other in the organic emitting layer to generate light to be emitted to the outside.

The light generated from the organic light emitting layer may be used as light that is visibly recognized only when the light passes through an interface between heteromaterials and material films having different refractive indexes. However, since the light is wave-guided or totally internally reflected by the interface and refractive indexes, the light is lost in the organic light emitting diode. Therefore, various studies on light extraction technologies which are capable of extracting the light lost in the organic light emitting diode to improve efficiency of the diode are being performed.

SUMMARY OF THE INVENTION

The present invention provides a method of fabricating a light functional substrate.

The present invention also provides an organic light emitting diode having a light functional substrate.

The feature of the present invention is not limited to the aforesaid, but other features not described herein will be clearly understood by those skilled in the art from descriptions below.

Embodiments of the present invention provide methods of fabricating a light functional substrate, the methods including: applying particles onto a surface of water contained in a container to form a monolayer constituted by the particles; immersing a substrate into the container; and drawing the substrate out of the container to form patterns constituted by the particles on the substrate in a first direction.

In some embodiments, the particles may be metal oxide nanoparticles.

In still other embodiments, each of the particles may have a diameter of about 10 nm to about 100 nm.

In even other embodiments, the methods may further include performing a thermal treatment on the substrate to remove water remaining on the substrate and surfaces of the particles after forming the patterns.

In further embodiments, the more the monolayer may increase in concentration, the more the patterns may be narrowed in interval therebetween.

In still further embodiments, the patterns may extend in the first direction and may be arranged in a second direction perpendicular to the first direction.

In other embodiments of the present invention, a light functional substrate includes: a substrate; a light scattering layer disposed on the substrate; and a first electrode disposed on the light scattering layer, wherein the light scattering layer includes patterns disposed on the substrate and constituted by particles, the patterns extend in the first direction and are arranged in a second direction perpendicular to the first direction, and the particles are metal oxide nanoparticles.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIGS. 2A to 2G are cross-sectional and perspective views illustrating a method of fabricating a light functional substrate according to an embodiment of the present invention; and FIG. 3 is a cross-sectional view of an organic light emitting diode according to an embodiment of the present invention.

DETAILED DESCRIPTION OF PREFERRED EMBODIMENTS

Figure 1:
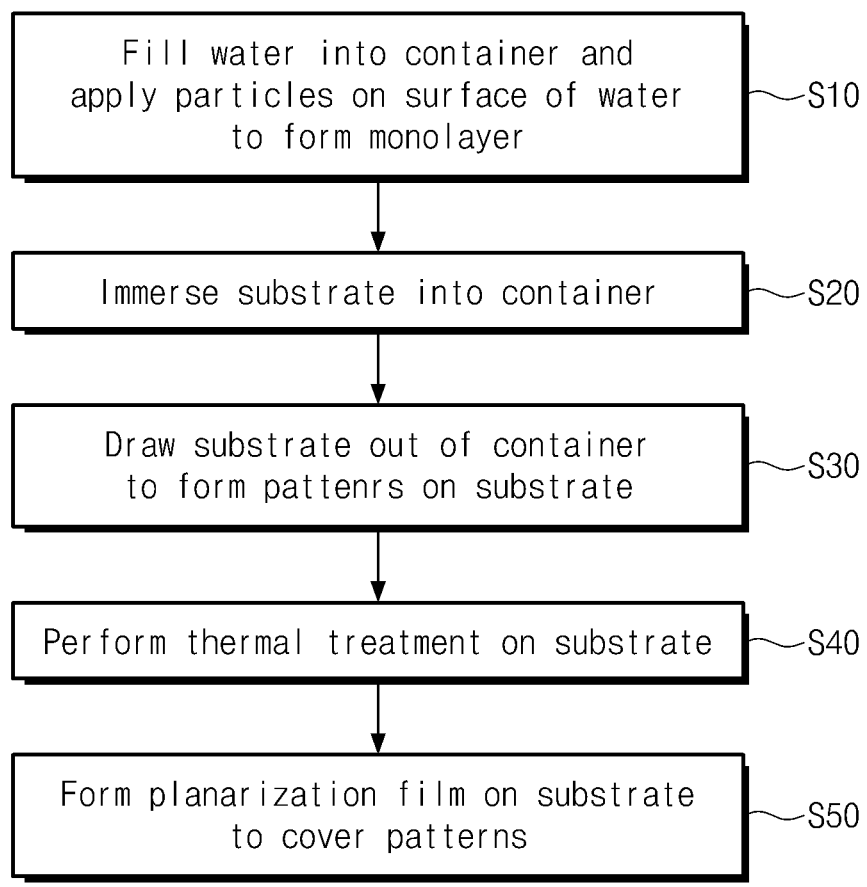
FIG. 1 is a flowchart illustrating a method of fabricating a light functional substrate according to an embodiment of the present invention.

Advantages and features of the present invention, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout.

In the following description, the technical terms are used only for explain a specific exemplary embodiment while not limiting the present invention. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

Additionally, the embodiment in the detailed description will be described with sectional views as ideal exemplary views of the present invention. Also, in the figures, the dimensions of layers and regions are exaggerated for clarity of illustration. Accordingly, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes. For example, an etched region illustrated or described as a rectangle will, typically, have rounded or curved features. Areas exemplified in the drawings have general properties, and are used to illustrate a specific shape of a semiconductor package region. Thus, this should not be construed as limited to the scope of the present invention.

FIG. 1 is a flowchart illustrating a method of fabricating a light functional substrate according to an embodiment of the present invention, FIGS. 2A to 2G are cross-sectional and perspective views illustrating a method of fabricating a light functional substrate according to an embodiment of the present invention.

Figure 2A:
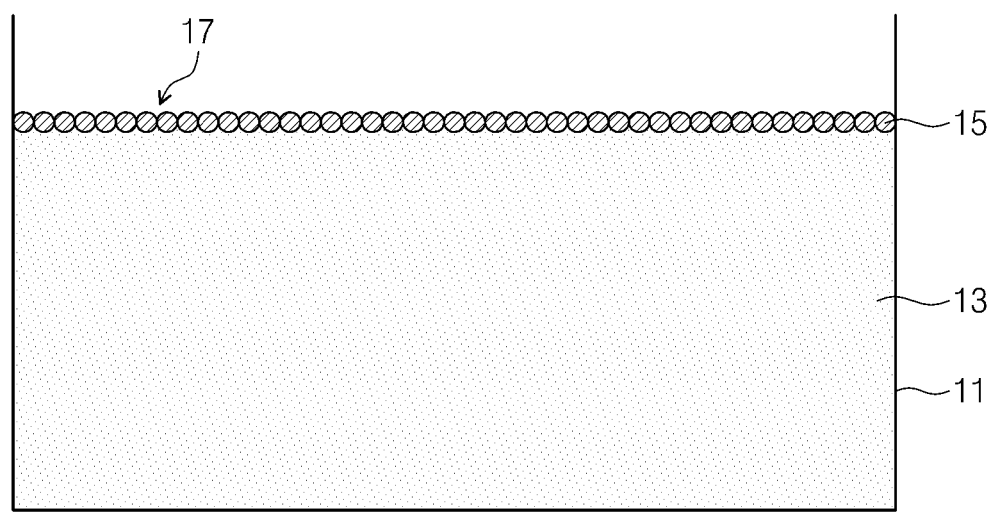

Referring to FIGS. 1 and 2A, in operation S10, a container 11 is filled with water 13, and particles 15 are applied onto a surface of the water 13 to form a monolayer 17.

The particles 15 may be metal oxide nanoparticles. For example, the metal oxide nanoparticles may be $TiO_2$, ZnO, or NiO. Each of the particles may have a diameter of about 10 nm and 100 nm. The particle may have an amphiphilic surface. In detail, the amphiphilic particle 15 may have one end formed of a hydrophilic material and the other end formed of a hydrophobic material. Thus, when the particles 15 are in contact with the water surface, the hydrophilic portions of the particles 15 are immersed, and the hydrophobic portions of the particles 15 are floated. Thus, the particles 15 may form the monolayer 17 on the water surface. The monolayer 17 may be used in the Langmuir-Blodgett method to be performed in the following process.

The monolayer 17 may have a concentration lower than about $10^{11}$/cc. The particles 15 may be controlled in concentration by using a solution used when the particles 15 are formed. Alternatively, the particles 15 may be controlled in concentration by putting two substrates into the water through both horizontal ends of the monolayer 17 and then broadening or narrowing an interval between the substrates.

Figure 2B:
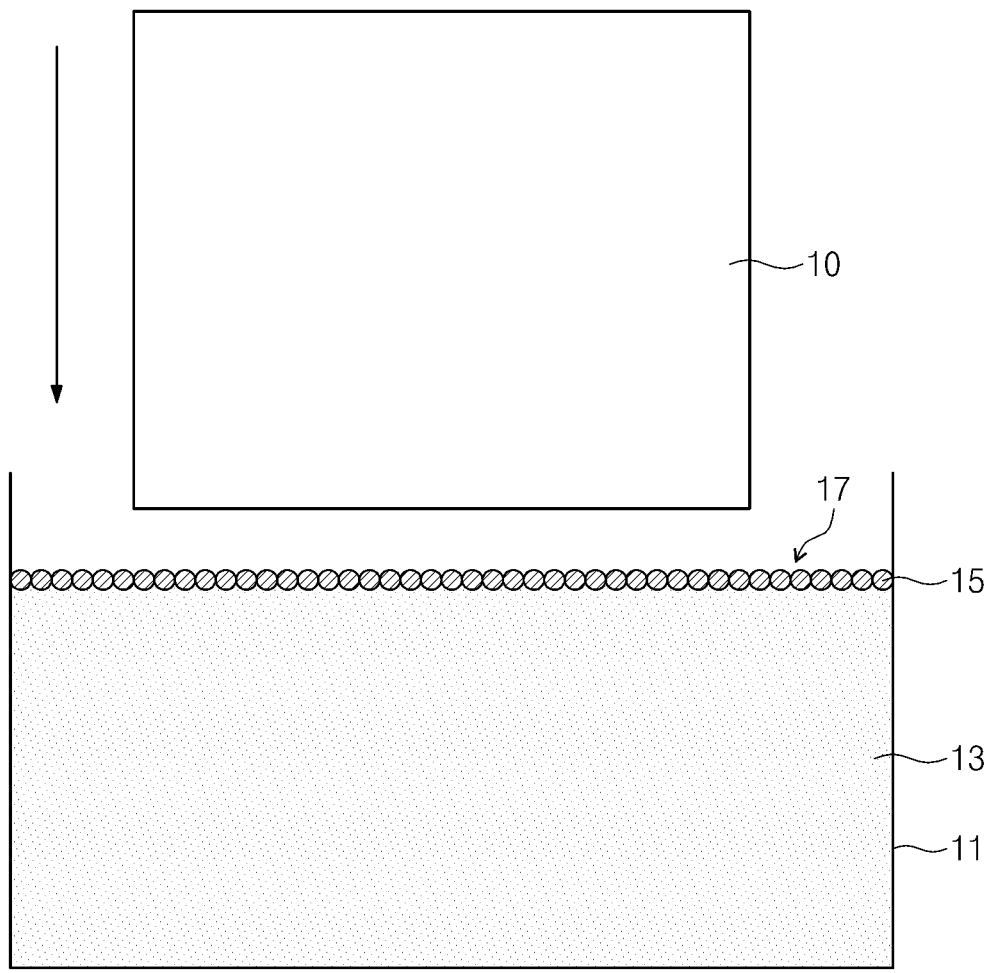
Figure 2C:
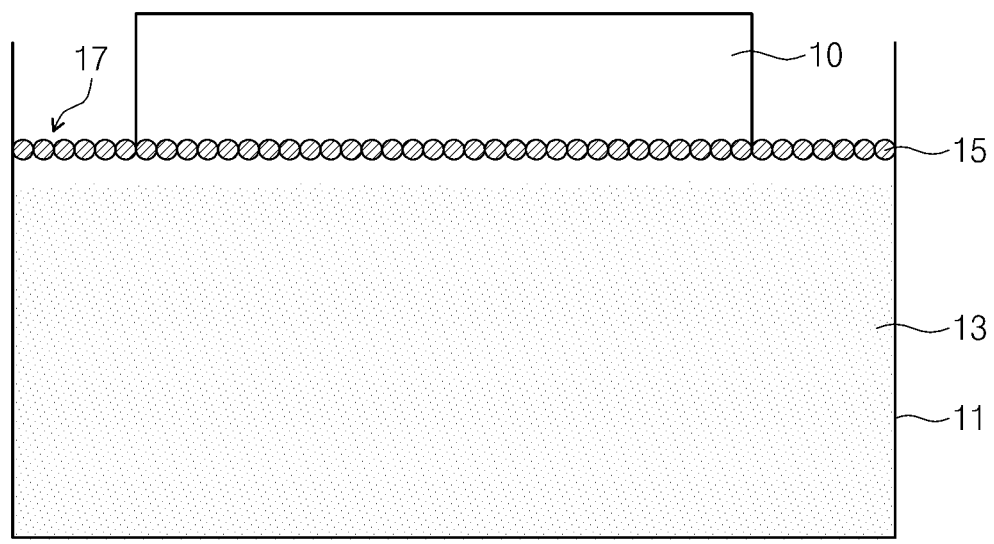
Figure 2D:
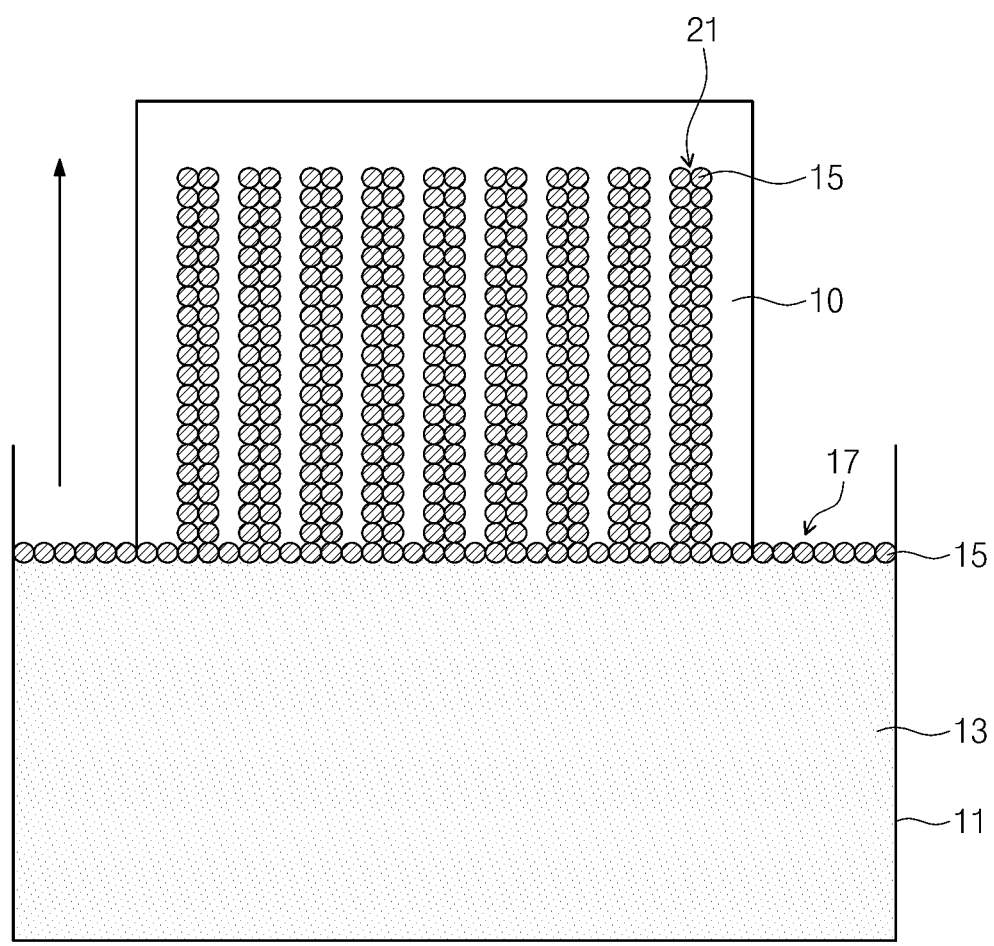
Figure 2E:
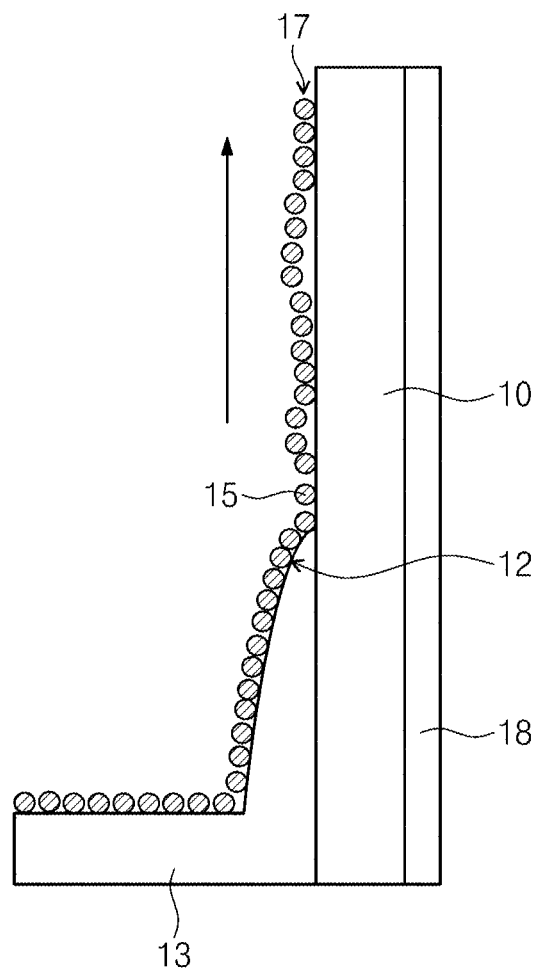
Figure 2F:
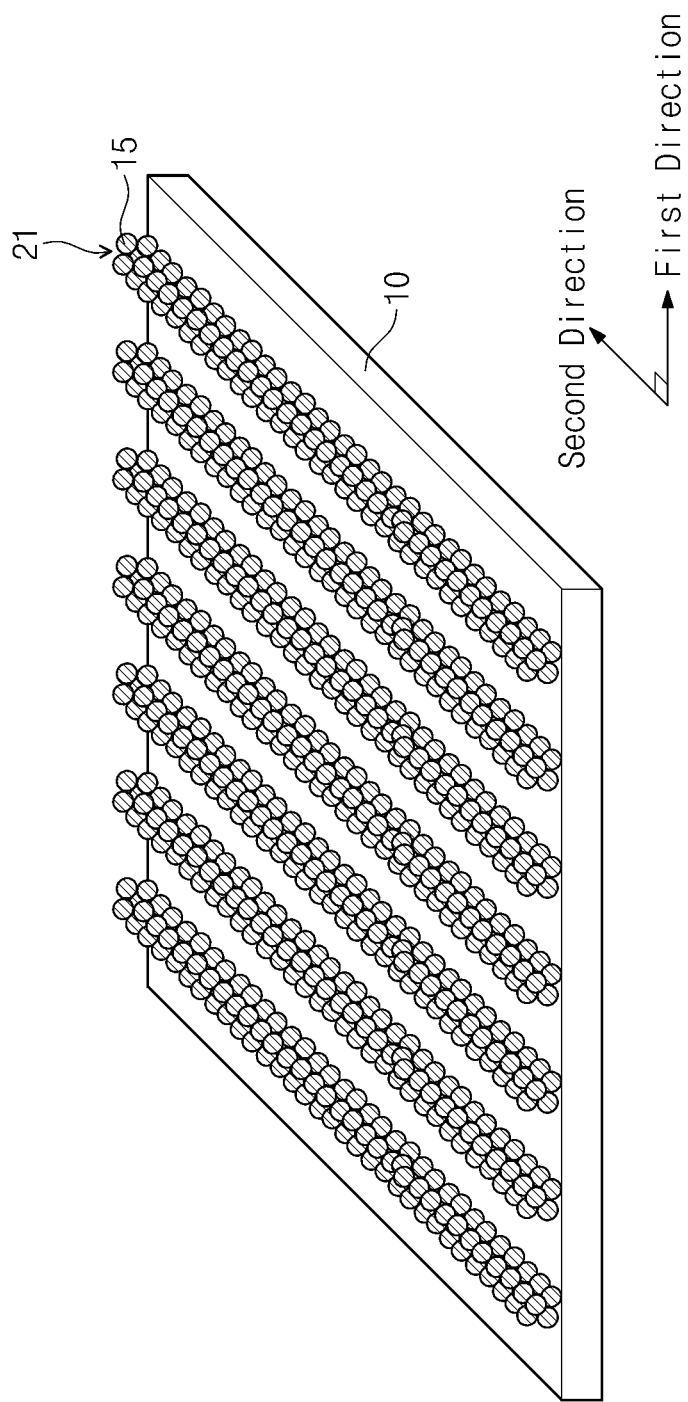

Referring to FIGS. 1, 2B, and 2C, in operation S20, the substrate 10 may be immersed in the container 11.

In detail, the substrate 10 may be vertically immersed in the container 11 filled with the water 13. For example, the substrate 10 may be a glass substrate, a quarts substrate, or a transparent organic substrate. The substrate 10 may have a hydrophilic surface. The substrate 10 may be immersed in the water 13 at a nonoscillation speed (for example, less than about 5 mm/min) so that the monolayer 17 may not be fluidized or torn.

Referring to FIGS. 1, 2D to 2F, in operation S30, the substrate 10 may be drawn out of the container 11 to form patterns 21 on the substrate 10.

The patterns 21 may be constituted by the particles 15. In detail, referring to FIG. 2E, when the substrate 10 is slowly drawn out of the container 11, a water film 12 between the monolayer 17 and the water 13 is adsorbed onto the surface of the substrate 10 by an interfacial tension, and then only the particles 15 remain on the surface of the substrate 10 while the water film 12 is evaporated. The hydrophilic portions of the particles 15 may be attached to the surface of the substrate 10. The coating method may be the Langmuir-Blodgett method. The Langmuir-Blodgett method may be a method in which a substrate is immersed into a hydrophilic or hydrophobic solution, and then the substrate is drawn out of the solution to form a thin-film on the substrate. The substrate 10 may be slowly drawn out of the container 11 by a structure 18 supporting the substrate 10. The patterns 21 may be formed by mixing an attraction action between the particles 15 for forming a domain and a stirring effect due to the evaporation of the water 13.

The patterns 21 may extend in a second direction and be arranged in a first direction perpendicular to the second direction. According to an embodiment, the particles 15 may be stacked on the substrate 10 in a plurality of layers to constitute the patterns 21, as shown in the drawings. According to another embodiment, the particles 15 may be applied on the substrate 10 in a single layer to constitute the patterns 21.

If the particles 15 constituting the monolayer 17 have a high concentration greater than about $10^{15}$/cc, the patterns 21 may not be formed because the patterns 21 are closely packed on the substrate 10.

An interval between the patterns 21 depends on the concentration of the particles 15 constituting the monolayer 17. The interval between the patterns 21 may broaden as the particles 15 decrease in concentration. On the other hand, the interval between the patterns 21 may be narrowed as the particles 15 increase in concentration. The interval between the patterns 21 may be adjusted to about several μm to about several hundreds nm by the concentration of the particles 15.

The particles 15 consumed by forming the patterns 21 on the substrate 10 may be directly supplied into the container 11.

Referring to FIG. 1, in operation S40, the substrate 10 may be thermally treated.

Water and other contaminants remaining on the surface 10 and the surfaces of the particles 15 may be removed by the thermal treatment. The thermal treatment may be performed at a temperature of about 150° C. under the vacuum atmosphere.

Referring to FIGS. 1 and 2G, in operation S50, a planarization film 23 may be formed to cover the patterns 21.

The planarization film 23 may be formed of a transparent material having a refractive index higher than that of the particle 15. For example, the planarization film 23 may include an oxide, an organic matter, or an oxide/organic mixture.

According to an embodiment, the particles 15 inducing light scattering may be applied onto the substrate 10 by using the Langmuir-Blodgett method to form a light functional substrate 20. Thus, the light functional substrate 20 having the patterns 21 constituted by the particles 15 may be fabricated without performing expensive vacuum deposition and lithography processes. The light functional substrate 20 may be used as a light scattering layer in the organic light emitting diode.

According to another embodiment of the present invention, a wire-grid polarizer may be fabricated by using the method of forming the light functional substrate 20. The wire-grid polarizer may be an optical device through which specially polarized light is transmitted, and vertically polarized light is reflected. The wire-grid polarizer may be used to polarize light to a backlight unit in a liquid crystal display and also be used to secure a high contrast ratio in an organic light emitting device.

The substrate 10 may have a self-optical function. The substrate 10 may have an optical characteristic in which electromagnetic waves of electromagnetic radiant rays (for example, visible rays) are transmitted. That is, the substrate 10 may transmit the electromagnetic waves without changing in phase or angle.

The patterns 21 may interact with the electromagnetic waves of the electromagnetic radiant rays (for example, the visible rays) so that one polarized light of the electromagnetic waves is substantially transmitted, and the other polarized light of the electromagnetic waves is substantially reflected. The electromagnetic waves reflected by the patterns 21 may change in wavelength according to a width between the patterns 21 and a thickness of each of the patterns 21.

FIG. 3 is a cross-sectional view of an organic light emitting diode according to an embodiment of the present invention.

Referring to FIG. 3, an organic light emitting diode 100 includes a light scattering layer 20, an anode electrode 30, an organic light emitting layer 40, a cathode electrode 50, and a protective layer 60, which are sequentially stacked on a substrate 10.

For example, the substrate 10 may be a glass substrate, a quarts substrate, or a transparent organic substrate. The substrate may have a refractive index of about 1.4 to about 1.7.

The light scattering layer 20 may include particles 15 and a planarization film 23 covering the particles 15. In detail, the particles 15 may be disposed on the substrate 10 as patterns 21. Referring to FIG. 2G, the particles 15 may be disposed in a second direction and be arranged in a first direction perpendicular to the second direction on the substrate 10. The particles 15 disposed in the second direction may be provided as one pattern 21. According to an embodiment, the particles 15 may be stacked on the substrate 10 in a plurality of layers to form the patterns 21, as shown in FIG. 3. According to another embodiment, the particles 15 may be applied onto the substrate 10 in a single layer to constitute the patterns 21.

The particles 15 may be metal oxide nanoparticles. For example, the metal oxide nanoparticles may be $TiO_2$, ZnO, or NiO. The particles may have a diameter of about several nm to about 100 nm. The patterns 21 may have an interval of about several tens μm to about several tens nm therebetween. Each of the patterns 21 may have a thickness of about several tens nm to about several hundreds nm.

The planarization film 23 may be formed of a transparent material having a refractive index higher than those of the particles 15. For example, the planarization film 23 may include an oxide, an organic matter, or an oxide/organic mixture.

The anode electrode 30 may be a transparent electrode or a reflective electrode. When the anode electrode 30 is the transparent electrode, the anode electrode 30 may be formed by using indium tin oxide (ITO), indium zinc oxide (IZO), or tin oxide. When the anode electrode 30 is the reflective electrode, the anode electrode 30 may be formed by using silver (Ag), aluminum (Al), nickel (Ni), platinum (Pt), or palladium (Pd).

The organic emitting layer 40 may be formed of an organic compound, an organic semiconductor, a metal complex compound, and the like. Also, the organic compound, the organic semiconductor, the metal complex compound, and the like may be used as a dopant.

The organic light emitting layer 40 may include at least one of a hole injecting layer, a hole transfer layer, an electron transfer layer, and an electron injecting layer.

The cathode electrode 50 may include a translucent or reflective conductive metal. For example, the cathode electrode 50 may include at least one of gold, silver, iridium, molybdenum, palladium, and platinum.

The protective layer 60 may protect the cathode electrode. The protective layer 60 may include a polymer.

The method of fabricating the light functional substrate according to an embodiment of the present invention includes the process of forming the patterns constituted by the particles on the substrate by using the Langmuire-Blodgett method. Therefore, the light functional substrate having the patterns constituted by the particles may be fabricated without performing the expensive vacuum deposition and lithography processes. Also, the structure according to the present invention may play a role as a polarization plate.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. Therefore, the preferred embodiments should be considered in descriptive sense only and not for purposes of limitation.

What is claimed is:

1. A method of preparing a substrate for an organic light-emitting diode, the method comprising:
    applying particles onto a surface of water contained in a container to form a monolayer constituted by the particles;
    immersing a substrate into the container; and
    drawing the substrate out of the container to form a plurality of parallel stripes of the particles on a surface of the substrate, wherein
    applying the particles includes increasing or decreasing concentration of the particles in the monolayer to thereby reduce or increase a distance between any adjacent two of the plurality of parallel stripes of the particles formed on the surface of the substrate.

2. The method of claim 1, wherein the particles are metal oxide nanoparticles.

3. The method of claim 1, wherein each of the particles has a diameter of about 10 nm to about 100 nm.

4. The method of claim 1, further comprising performing a thermal treatment on the substrate to remove water remaining on the substrate and surfaces of the particles after forming the plurality of parallel stripes of the particles.

* * * * *